United States Patent [19]
Jones et al.

[11] Patent Number: 5,696,789
[45] Date of Patent: Dec. 9, 1997

[54] APPARATUS AND METHOD FOR SIGNAL IDENTIFICATION

[75] Inventors: Robert V. Jones, Bountiful; Richard J. Saggio, Salt Lake City; John W. Zscheile, Jr., West-Farmington, all of Utah

[73] Assignee: Unisys Corporation, Blue Bell, Pa.

[21] Appl. No.: 399,274

[22] Filed: Mar. 6, 1995

[51] Int. Cl.$^6$ .............................. H04B 15/00; H04K 1/00; H04L 27/30
[52] U.S. Cl. .................. 375/200; 375/207; 375/232; 375/367; 370/335; 370/342; 370/441; 370/527
[58] Field of Search ........................... 375/200, 206, 375/207, 208, 232, 367; 370/320, 335, 342, 441, 527

[56] References Cited

U.S. PATENT DOCUMENTS

| | | | |
|---|---|---|---|
| 5,031,173 | 7/1991 | Short et al. | 370/342 |
| 5,231,400 | 7/1993 | Mouldin et al. | 342/45 |
| 5,594,754 | 1/1997 | Dohi et al. | 375/200 |
| 5,596,570 | 1/1997 | Soliman | 370/252 |

*Primary Examiner*—Stephen Chin
*Assistant Examiner*—Don Vo
*Attorney, Agent, or Firm*—John B. Sowell; Mark T. Starr; John F. O'Rourke

[57] ABSTRACT

A novel code division multiple access (CDMA) system and apparatus is provided which permits a plurality of encoded modulated data messages to be transmitted simultaneously on the same channel in one frequency band as a composite CDMA signal. An identification signal is generated and spread by a spreading signal having a duty cycle less than fifty percent to produce a combined signal which is transmitted to a receiver having a tapped delay with a plurality of taps each of which produce a replica of the received combined signal delayed by an odd multiple of the duty cycle of the spreading signal. Each of the replica signals is multiplied by a predetermined weighted value to produce weighted delayed signals and a controller responsive to the received combined signal, is employed for controlling individual weighted delayed signals which are then combined to suppress the spreading signal leaving the identification signal.

22 Claims, 12 Drawing Sheets

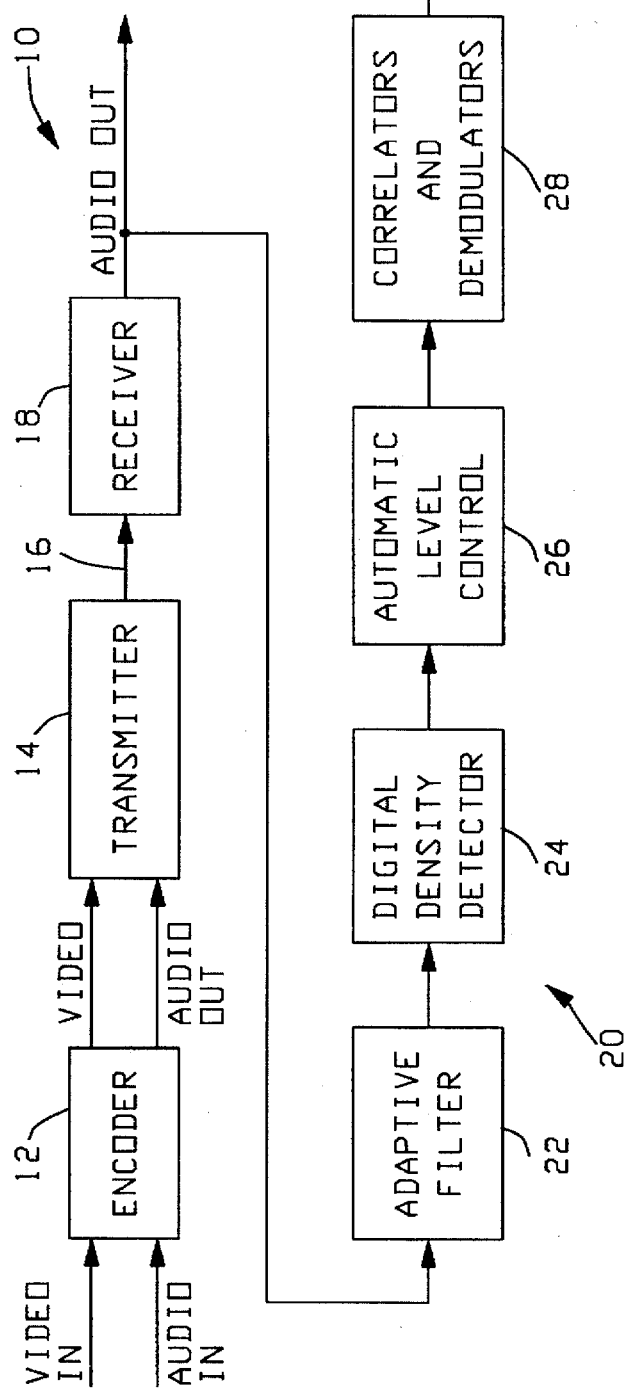
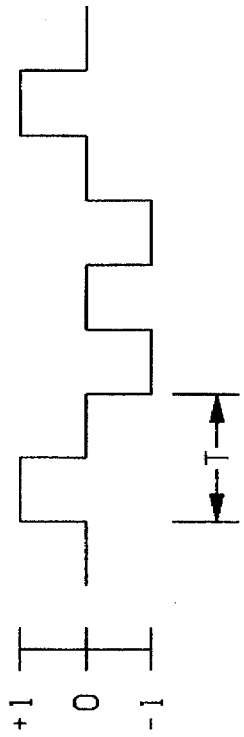

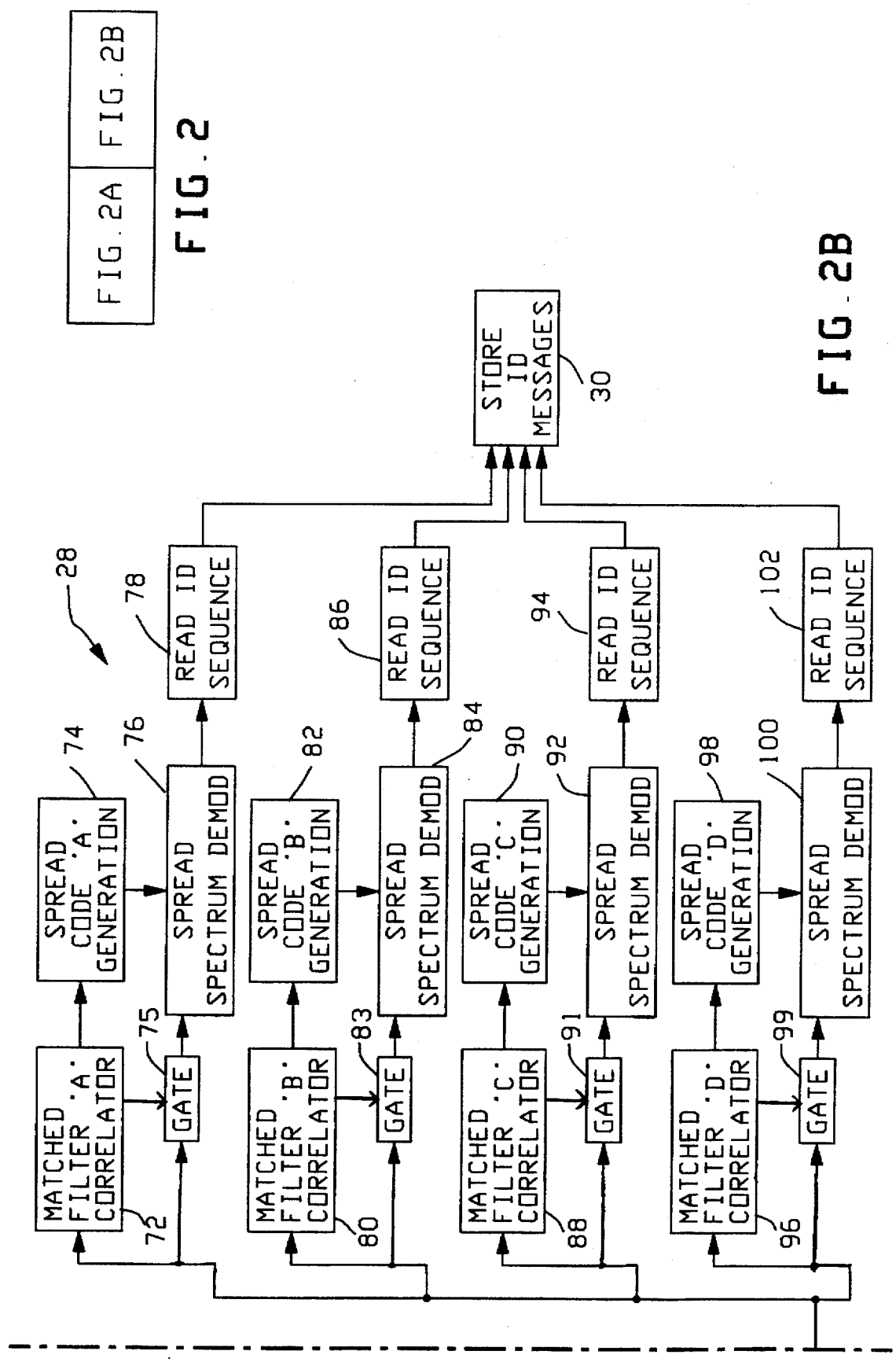

APPARATUS AND METHOD FOR SIGNAL IDENTIFICATION

FIELD OF THE INVENTION

The present invention relates to communications, and more particularly to signal modulation and demodulation for communications. The present invention also relates to signal modulation and demodulation in general, and to signal identification.

BACKGROUND OF THE INVENTION

Local area networks (LANs) employing a shared bus master ring and interface units are known. In one prior art system, the LAN stations contend for use of the bus. Such LAN interface units employ a protocol including a plurality of auxiliary bits in the message such as sync or header bits which are used to identify the start of the message and in some cases the message link. This is followed by source and/or destination bits which identify the address of the unit for which the data is intended. The source bits are followed by data, which is optionally followed by a message trailer or end of message bits. Some Time Division Multiple Access (TDMA) mode of operation networks employ predetermined time slots for each user station on a network.

In some prior art TDMA system, predetermined time slots were generated for each user station on the network.

Besides the TDMA tagging described above, another approach is with code division multiple access (CDMA). In a CDMA system, each transmitting station modulates the data that it sends by a respective spreading code which is unique to that station. Modulated data from several such stations can then be sent on a single wireless channel/cable in one frequency band to the receiving station, with all of the CDMA signals combined in that transmission. At the receiving station, the data from any one particular transmitting station can be recovered by multiplying the transmitted composite CDMA signal by the same spreading code(s) which that one particular transmitting station used. One example of a prior art CDMA communication system is described in U.S. Pat. No. 4,908,836 issued Mar. 13, 1990 for "Method and Apparatus for Decoding Multiple Bit Sequences that are Transmitted Simultaneously in a Single Channel" by Craig K Rushforth et al. Another CDMA communication system is described in U.S. Pat. No. 5,031,173 issued Jul. 9, 1991 for "Decoder for Added Asynchronous Bit Sequences" by Robert T. Short et al.

Signal spreading, or spread-spectrum signals, have been formed by mixing or multiplying a pseudonoise code or signal with the data or other signal to be communicated.

Various applications require appending a code to, or applying a signal to, a data signal in order to identify that signal, its source, etc. U.S. Pat. No. 5,339,312 issued Aug. 16, 1994 for "Station Interface Unit" by Lawrence D. Sawyer et al involves applying appropriate identification tags to data before it is time multiplexed. An interface unit is described therein for receiving a stream of parallel bit words tom a source bus comprising an address field, a data field and a clock field. The parallel bit words are first phase adjusted and stored in an input register where the address field is compared in enable logic to determine whether to store the data field in a sink buffer register for processing. The word in the input register is coupled to the buffer storage register. The address field is further compared in passthrough disable logic to determine whether to pass the address and data field to an output register or to generate a null code address in the address field of the word being outputted from the buffer storage register. The word in the buffer storage register is coupled through a word selector to an output register. A host source is also coupled to the word selector so that a source word may be written into the output register when a null code address is appended to a parallel bit word being supplied as an input to that word selector.

U.S. Pat. No. 5,231,400 issued Jul. 27, 1993 for "Covert Electronic Battlefield Identification System" by Richard B. Mouldin et al uses pseudonoise spreading codes in an electronic battlefield identification system to permit identification. An electronic identification system is described for use by vehicles on a battlefield. This system comprises an interrogator circuit in an attack vehicle and a transponder circuit in several other vehicles which are friendly but could be mistaken for the enemy. This is particularly useful for identification friend or foe OFF) applications. In operation, the interrogator circuit transmits a time shifted code which is circuit for an actual enemy to detect and/or jam, and which causes the transponder circuits to send a response from only a selected one of the other friendly vehicles that is being examined by the attack vehicle as a target.

SUMMARY OF THE INVENTION

Accordingly, an object of the present invention is to add an identification or other signal or field to a data signal without perceptibly degrading either signal.

Another object of the present invention is to modulate an identification signal which can then be applied to another signal which it is intended to identify.

A further object of the present invention is to track the amplitude or some other characteristic of one signal and to modify or modulate another signal based thereon so that the amplitude or other characteristic of the second signal tracks that of the first signal.

Still other objects of the present invention are to provide apparatus and method for identifying the source of data contained in a signal, or identifying the distribution channel that the data was received over, or for embedding other messages that can be used to facilitate the performance of other functions.

Still further objects of the present invention are to provide apparatus and method for providing positive identification of the program source and/or distribution channel such that the program can be identified directly, cross references to schedules/line-ups are not required, various points in the distribution channel can be positively identified, and previously recorded programs can be identified.

Yet other objects of the present invention are to provide apparatus and method for program identification that do not require any modifications to the listener's receiver, thereby minimizing installation and maintenance costs and improving acceptance by potential test subjects.

Still other objects of the present invention are to provide apparatus and method for program identification that do not degrade the audio quality of the received program, thereby improving acceptance by potential test subjects.

Further objects of the present invention are to provide apparatus and method for program identification which are capable of higher data rates than could be provided with conventional spread spectrums techniques alone, enabling longer messages to be sent with more precise identification of program and/or distribution channel and enabling messages to be sent more frequently enabling more accurate time resolution.

Still further objects of the present invention are to provide apparatus and method for program identification wherein multiple identification messages can be detected concurrently, so that program source and multiple points in the distribution chain can be identified, and identification messages can be applied independently of each other.

Still another object of the present invention is to provide amplitude tracking of one signal to control amplitude of another signal before the two signals are combined to produce a composite signal.

A still further object of the present invention is to modulate a sub-audible identification signal without perceptible degradation to the primary audio signal with which that identification signal is then to be combined.

Briefly, these and other objects of the present invention are accomplished by apparatus and method for inserting a coded message into an audio signal, and subsequently recovering that message. A sub-audible coded message is inserted in another signal such as the audio portion of a television signal, for example in order to enable positive identification of a program or commercial currently being viewed. This coded message is inserted or added to the other signal before the latter is transmitted. In an encoder provided for this purpose, a coded identification sequence, for example identifying either the specific program then on the signal or a link in the distribution chain for that program is modulated and thus spread by a pseudonoise or pseudorandom spreading sequence. The spread sequence is then inserted into the audio program. The resulting modified signal is then transmitted. After that signal has been received, it can then be utilized as intended. However, in addition, the previously added identification message is retrieved from the received message. To accomplish this retrieval and decode the added signal, the received signal is sampled, the main signal is suppressed and the spread added signal is then recovered and despread. A combination of pre-processing techniques, including adaptive filtering, digital density detection, and automatic level control, are used to suppress the main signal from the received signal to obtain the added signal prior to despreading of same.

Other objects, advantages and novel features of the invention will become apparent from the following detailed description of the invention when considered in conjunction with the accompanying drawings.

BRIEF DESCRIPTION OF THE DRAWINGS

In the drawings,

FIG. 1 is a block diagram of a content identification system according to the present invention;

FIGS. 2A and 2B together show in greater detail one embodiment of the system of FIG. 1;

FIG. 3 A is another waveform timing diagram showing signals in the system of FIG. 1;

DESCRIPTION OF THE PREFERRED EMBODIMENTS

Figure 2A:
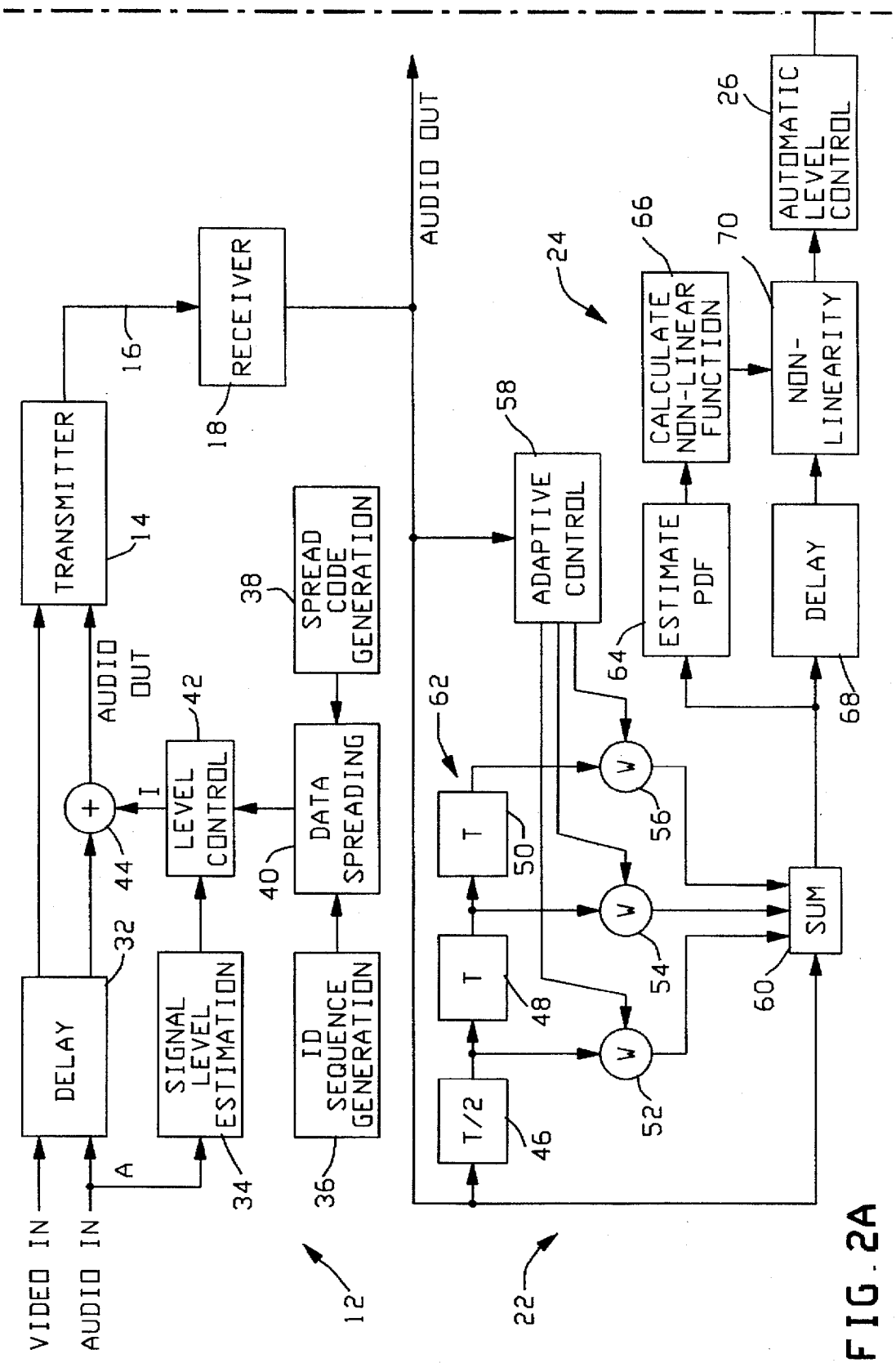

Referring now to the drawings, wherein like reference characters designate like or corresponding parts throughout the several views, there is shown in FIG. 1 a preferred program identification system 10 which, as shown, is intended for identification, transmission and reception of a television signal including both a video signal and an audio signal. In the system 10 of FIG. 1, an identification code or signal for the particular program or its source is preferably applied to the audio signal, and not to the video signal, by encoder 12. The video and audio signals produced by encoder 12 are then provided to transmitter 14. Transmitter 14 in turn suitably modulates or otherwise processes these signals, and transmits via communication medium 16 the so processed video and audio signals provided to transmitter 14 by encoder 12. Transmitter 14 appropriately modulates and amplifies, as needed, the video and audio signals provided to the transmitter, and transmits the so modulated and amplified (and if desired encrypted) video and audio signals onto an appropriate communication medium 16. Communication medium 16 can for example be the airwaves, a satellite communication system, a closed-circuit communication system, or the like. Receiver 18 (which can be a television set) in turn receives the video and audio signals from communication medium 16, and suitably demodulates or otherwise processes those signals for use by the intended user. However, the so received audio signal is also provided to decoder 20 which essentially strips the identification signal(s) or code(s) from the audio signal for retention in storage or memory 30. To decode the identification signal or extract it from the audio output of receiver 18, decoder 20 suppresses the audio signal using adaptive filter 22 and digital density detector or non-linear density discriminator 24 to produce the so recovered spread identification signal at the output of detector 24. The amplitude of the recovered spread identification signal produced by detector 24 is then adjusted to a usable level by automatic level control 26, after which the spread identification signal is despread and demodulated by correlators and demodulators 28 to produce the identification messages originally applied by encoder 12. These messages (e.g. signals or codes) are then provided to and stored by storage or memory 30.

One embodiment of system 10 is shown in greater detail in FIGS. 2A and 2B.

Figure 3A:
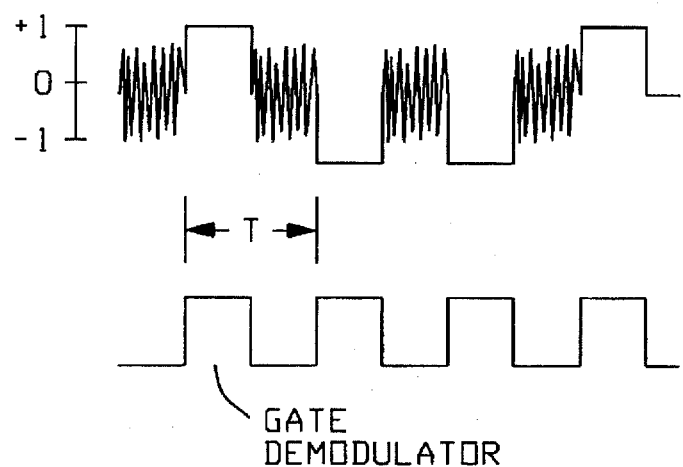
FIG. 3 is a waveform timing diagram showing one duty cycle chip structure for a signal that can be produced by a portion of the system of FIG. 1 and a portion of the system of FIG. 2A.

In encoder 12, a coded sequence identifying either the specific program or a link in the distribution chain is modulated by a pseudo-random spreading sequence, and the resulting spread signal is then inserted into the program audio signal. To facilitate the processing performed by decoder 20 during the decoding process, the spreading sequence preferably uses a chip shape with a 50% duty cycle such as is illustrated in FIG. 3. In encoder 12, the amplitude of identification signal I is adjusted to track variations in the level of the audio signal A for some period of time, attempting to maintain a constant M ratio between those two amplitudes. A short preamble is preferably appended to the beginning of each identification message to facilitate the rapid acquisition of the message by receiver 18 and decoder 20. This preamble is utilized by the matched filter correlators 72, 80, 88 and 96 of FIG. 2B, as is described below.

As shown in FIG. 2A, encoder 12 includes sisal level estimator 34 which receives and estimates the continuous amplitude of the program audio signal A for some period of time. The estimated varying amplitude value is used to control level control 42. Level control 42 receives and controls the amplitude of the spread identification signal. The digital identification message is generated by D sequence generator 36. This message can be preset or can be established by the user. An appropriate spreading code, preferably a pseudonoise code, is produced by spreading code generator 38. The digital identification code and the digital spreading code are mixed or multiplied together by data spreader 40, which provides to level control 42 a digital spread identification code. Level control 42 changes or controls the amplitude or magnitude level of the spread identification code or signal, responsive to the estimated signal level of the audio signal, so that the amplitude of the resulting identification signal I is preferably considerably less than that of the audio signal A. Delay 32 imposes a suitable delay on the program video signal and the program audio signal so that the identification signal I is applied to the appropriate portion of the audio signal A to which it relates. The delayed audio signal from delay 32, and the identification signal from level control 42, are combined by summer 44 which produces the AUDIO OUT signal. The AUDIO OUT signal has applied thereto an identification signal (very preferably a subaudible identification signal) which is recovered by decoder 20 as further discussed below. The AUDIO OUT signal from summer 44, and the delayed video signal from delay 32, are provided to transmitter 14. Transmitter 14 applies suitable modulation or other processing to those video and audio signals, and transmits them onto a suitable communication medium 16 from which they can be received by receiver 18.

Figure 4:
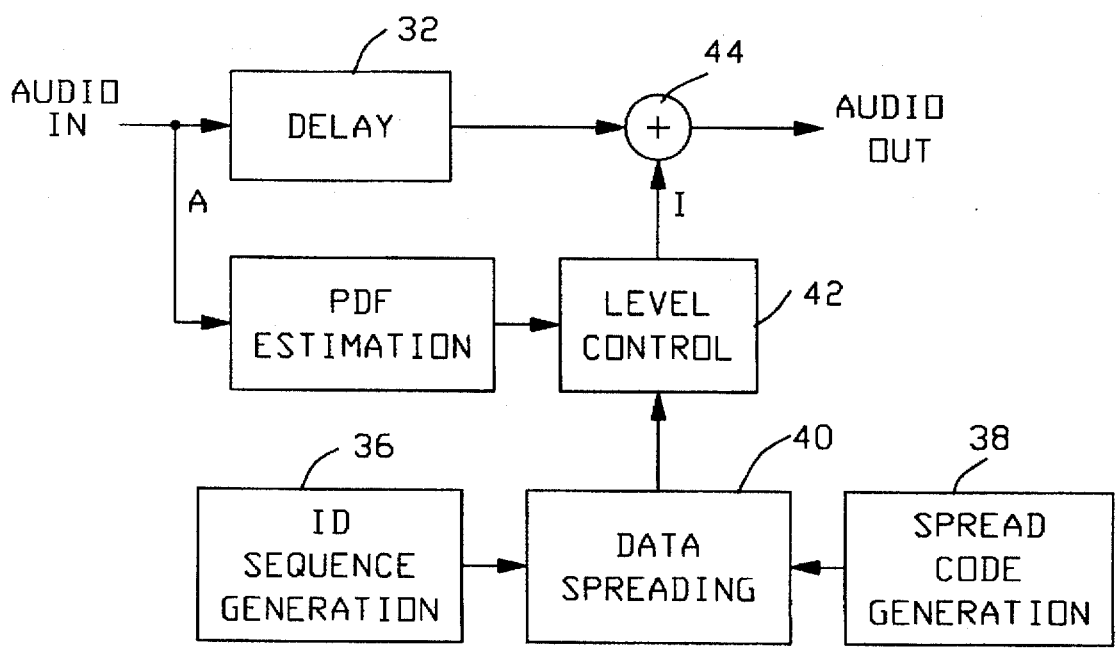
FIG. 4 shows an embodiment era potion of the system of FIG. 1.

FIG. 4 shows an encoder which can be used as encoder 12 of FIG. 1. In the encoder of FIG. 4, the level control 42 is responsive to the estimated probability distribution function (PDF) level or value of the program audio signal. The digital identification message is provided to level control 42 by generator 36 after being first spread. Level control 42 then controls the amplitude or magnitude level of the identification message based on the estimated PDF value of the audio signal. As in FIG. 2A, this is done to ensure that the amplitude of the identification message remains relatively low (even during quiet periods) compared with the amplitude of the audio signal, so that the identification signal does not interfere with the audio signal. The AUDIO OUT signal produced by the encoder of FIG. 4 is then provided to transmitter 14 and utilized in the same manner as world the AUDIO OUT signal produced by encoder 12 of FIG. 2A.

Figure 4A:
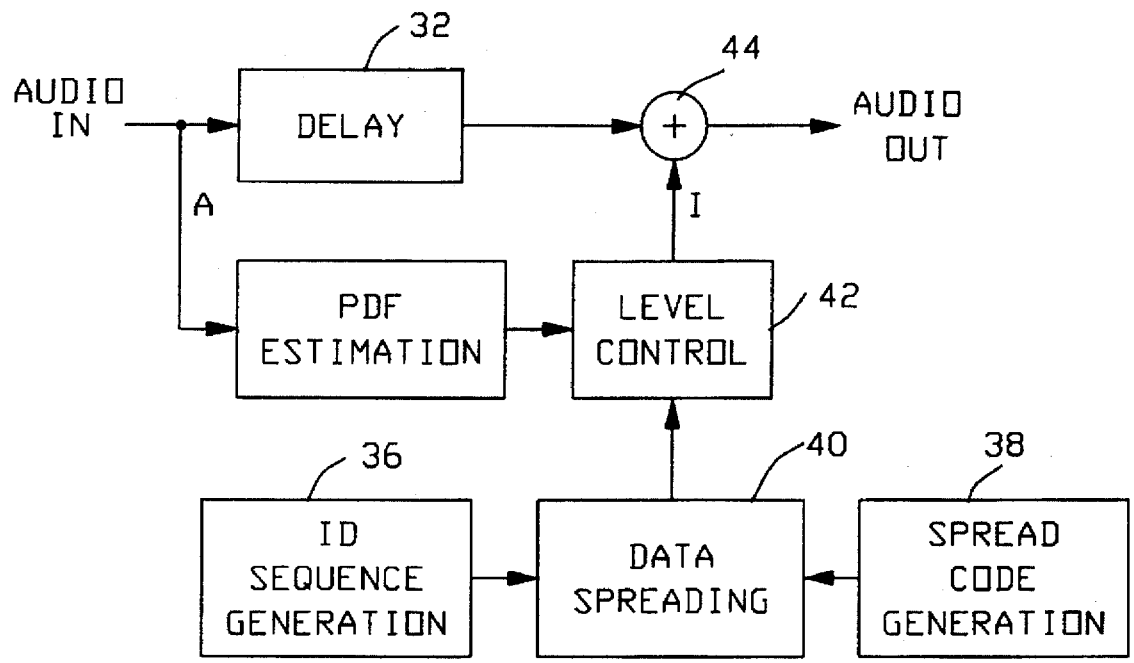
FIG. 4A shows another embodiment of that portion of the system of FIG. 1.

FIG. 4A shows another encoder which can be used as encoder 12 of FIG. 1. The encoder of FIG. 4A differs from the encoder of FIG. 4 in that the level control 42 is responsive to estimated root mean squared (RMS) level or value of the program audio signal, instead of (for FIG. 4) the estimated PDF of that signal. The digital identification message is provided to level control 42 by generator 36 after being first spread. Level control 42 then controls the amplitude or magnitude level of the identification message based on the estimated RMS value of the audio signal. As in FIG. 2A and FIG. 4, this is done to ensure that the amplitude of the identification message remains relatively low (even during quiet periods) compared with the amplitude of the audio signal, so that the identification signal does not interfere with the audio signal. The AUDIO OUT signal produced by the encoder of FIG. 4A is then provided to transmitter 14 and utilized in the same manner as world the AUDIO OUT signal produced by encoder 12 of FIG. 2A.

However, preferred apparatus and method for amplitude tracking of the audio signal, to control the amplitude level of the identification signal to be added thereto, are shown in FIGS. 4B and 7-14. In order to avoid interference of the identification signal with the audio signal, it is strongly preferred that the amplitude of the audio signal be tracked and that the amplitude of the identification signal to be applied thereto be controlled in response to that tracking. Preferred ways of providing such amplitude tracking and control are shown in FIGS. 4B and 7-14. FIGS. 7-14 are respectively adapted from FIGS. 1-8 of our U.S. patent application Ser. No. 08/382,738 filed Feb. 2, 1995 for "Apparatus and Method for Amplitude Tracking", which provides a description of those figures. Our U.S. patent application Ser. No. 08/382,738 is hereby incorporated by reference herein.

Figure 4B:
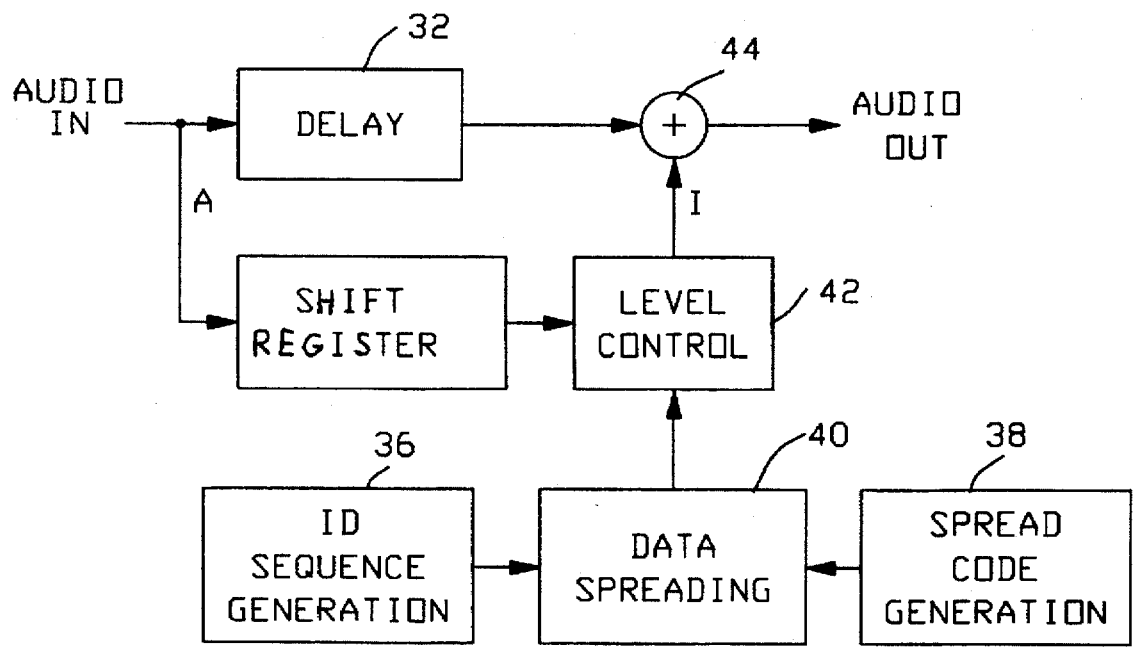
FIG. 4B shows a preferred embodiment of that portion of the system of FIG. 1.

FIG. 4B shows a preferred encoder which can be used as encoder 12 of FIG. 1. The encoder of FIG. 4B differs from the encoder of FIG. 4 and the encoder of FIG. 4A in that level control 42 is responsive to the shift register described in our U.S. patent application Ser. No. 08/382,738 filed Feb. 2, 1995. In FIG. 4B, the shift register corresponds to the shift register 136 of FIG. 9, and level control 42 corresponds to the processor 138 of FIG. 9 and the multiplier 124 of FIG. 8. This shift register can be implemented as a tapped delay line. The digital message is provided to level control 42 by generator 36 after being first spread. Level control 42 then controls the amplitude or magnitude level of the identification message based on the successive audio signal values stored in the shift register. As in FIGS. 2A, 4 and 4A, this is done to ensure that the amplitude of the identification message remains relatively low (even during quiet periods) compared with the amplitude of the audio signal, so that the identification signal does not interfere with the audio signal. The AUDIO OUT signal produced by the encoder of FIG. 4B is then provided to transmitter 14 and utilized in the same manner as would the AUDIO OUT signal produced by encoder 12 of FIG. 2A.

Although what is described in our U.S. patent application Ser. No. 08/382,738 is preferred, amplitude level control of the identification signal can be accomplished by other means. For example, where a digital signal is to be added to an audio signal, a constant amplitude can be used for the digital modulation of the audio signal. The audio quality of the resulting signal is acceptable where there is a sufficiently high audio signal present, but during quiet intervals the digital signal can be heard as a noise source. An alternative to removing the noise is to lower the level of the digital signal and thereby seriously degrade the ability to demodulate the digital data from the audio signal when received. The digital identification signal needs to have a high enough signal to noise ratio to facilitate accurate demodulation but also needs to be at a low enough amplitude level so that it cannot be heard unaided. Other, less preferred, approaches to controlling the amplitude level of the identification sisal can be implemented by using estimates of the RMS level or alteratively estimates of the Probability Density Function (PDF) of the audio signal to control the amplitude of the identification signal.

Block 34 performs an estimation of the varying amplitude of the audio signal A. This estimation is then used by block 42 to vary the amplitude of the identification signal I before combining the two signals. Preferably, this is accomplished in the manner shown in FIGS. 4B, 8, 9, 11, and 13, as described in our U.S. patent application Ser. No. 08/382,738 filed Feb. 2, 1995. That patent application also describes an alternative approach (shown in FIGS. 10 and 12) which may alternatively be so utilized as block 34 and 42 of encoder 12. Alternatively, as shown in FIG. 4, block 34 could instead perform estimation of the PDF of the audio signal A continuously, which estimation would be utilized by level control 42 in varying the amplitude of identification signal I to be applied to the delayed audio signal. As another alternative, as shown in FIG. 4A, RMS estimation could instead be used to perform the audio level estimation.

Where multiple identification messages are independently applied to the audio sisal, orthogonal codes are preferably used to differentiate between these various messages. Preferably, such orthogonal codes would be provided for this purpose by using the linear recurring sequences known as Gold codes as the orthogonal codes for this purpose. Gold codes are described in Robert Gold, "Optimal Binary Sequences for Spread Spectrum Multiplexing" in *IEEE Transactions on Information Theory*, Vol. IT-13, pp. 619–621, October 1967, and in Robert Gold, "Characteristic Linear Sequences and their Coset Functions" in *Journal of the Society for Industrial and Applied Mathematics (SIAM)*, Vol. 14, No. 5, September 1966, which are hereby incorporated by reference herein. Gold codes are preferred for this purpose because they are effective and are relatively simple to implement.

Multiple levels of identification messages (for example respectively identifying producer, network, local station, cable system, etc.) can be independently applied to the audio signal at different points in the distribution process. Orthogonal spreading codes are then preferred to differentiate between the various identification signals and thus differentiate between the various levels of distribution identified thereby. For this purpose, orthogonal codes are assigned to encoders intended for different links in the distribution chain (e.g., code "A" to the producer, code "B" to the network, code "C" to the local station, etc.). Gold codes are strongly preferred for this purpose.

Amplitude level control using amplitude tracking in any of the manners described above can minimize the perceived impact of the identification signal I by adjusting the amplitude of the identification signal to track variations in the audio signal level. As discussed above, various approaches are shown in FIGS. 2A, 4, 4A, 4B and 7–14.

To prevent the identification signal from being distorted by the application and the recovery process, it is given a chip structure with a duty cycle less than or equal to 50%, preferably a 50% duty cycle chip structure, as indicated in FIG. 3. Where the delays imposed by adaptive filter 22 (described below) are odd multiples of half a chip period, the active portion of each chip would not be corrupted by artifacts from other chips (i.e. no inter-chip interference). FIG. 3 illustrates one example of preferred spreading sequence chip shaping. A chip is one pseudonoise bit, which would have a value of +1 or −1; the end of that bit is indicated by a return to zero. Thus, FIG. 3 illustrates four such chips, having values of +1, −1, −1 and +1 in the sequence illustrated in FIG. 3.

In FIG. 2A, adaptive filter 22 is provided by an adaptive transversal filter including delays 46, 48 and 50, a respective linear weight multiplier 52, 54, 56 each fed by a respective tap from the output of a respective such delay, adaptive control 58 controlling the respective weights of those three multipliers, and summer 60. Summer 60 sums together the audio sisal from receiver 18 with the respective outputs of weighted multipliers 52, 54 and 56. Delays 46, 48 and 50 constitute a tapped delay line 62. Delay 46 applies a delay value of T/2, and delays 48 and 50 each applies a delay value of T, where T is one chip period (shown in FIG. 3) of the identification signal. Thus, respective total delays of T/2, 3T/2 and 5T/2 appear at the respective taps off delay line 62 to multipliers 52, 54 and 56. Adaptive control 58 responsive to the audio signal controls the respective weights of multipliers 52, 54 and 56 using a least mean squared (LMS) algorithm or some other adaptive algorithm. The tapped delay line structure for adaptive filter 22 shown in FIG. 2A forms a high pass filter that adaptively reconfigures itself to eliminate a large portion of the audio signal energy. Because the respective total delays appearing at the delay line taps immediately following delays 46, 48 and 50 are T/2, 3T/2 and 5T/2, which are odd multiples of half a chip period T, and the identification signal for this embodiment has a 50 percent duty cycle chip structure (shown in FIG. 3), the active portion of each chip will not be canceled or corrupted by artifacts from other chips (i.e. no inter-chip interference). Alternatively, these total delays at the delay line taps can be odd multiples of xT, where x is less than or equal to 0.50 or 50%; the chip duty cycle ratio imposed by generator 38 would then be less than or equal to x.

It is preferred that adaptive control 58 employ as an adaptive algorithm the least mean squared (LMS) algorithm described in any of the articles by Widrow et al. listed below.

Examples of adaptive algorithms that could be implemented or utilized by adaptive control 58 are provided in Bernard Widrow, John R. Glover, Jr., John M. McCool, John Kaunitz, Charles S. Williams, Robert H. Hearn, James R. Zeidler, Eugene Dong, Jr. and Robert C. Goodlin "Adaptive Noise Cancelling: Principles and Applications" in *Proceedings of the IEEE*, Vol. 63, No. 12, pp. 1692–1716, December 1975; B. Widrow, P. E. Mantey, L. J. Griffiths and B. B. Goode, "Adaptive Antenna Systems" in *Proceedings of the IEEE*, Vol. 55, No. 12, pp. 2143–2159, December 1967; Bernard Widrow, John M. McCool, Michael G. Larimore and C. Richard Johnson, Jr. "Stationary and Nonstationary Learning Characteristics of the LMS Adaptive Filter" in *Proceedings of the IEEE*, Vol. 64, No. 8, pp. 1151–1162, August 1976; Bernard Widrow and John M. McCool, "A Comparison of Adaptive Algorithms Based on the Methods of Steepest Descent and Random Search" in *IEEE Transactions on Antennas and Propagation*, Vol. AP-24, No. 5, pp. 615–637, September 1976; and Bernard Widrow, Kenneth M. Duvall, Richard P. Gooch, and William C. Newman, "Signal Cancellation Phenomena in Adaptive Antennas: Causes and Cures" in *IEEE Transactions on Antennas and Propagation*, Vol. AP-30, No. 3, pp. 469–478, May 1982, which are all hereby incorporated by reference herein.

Figure 5:
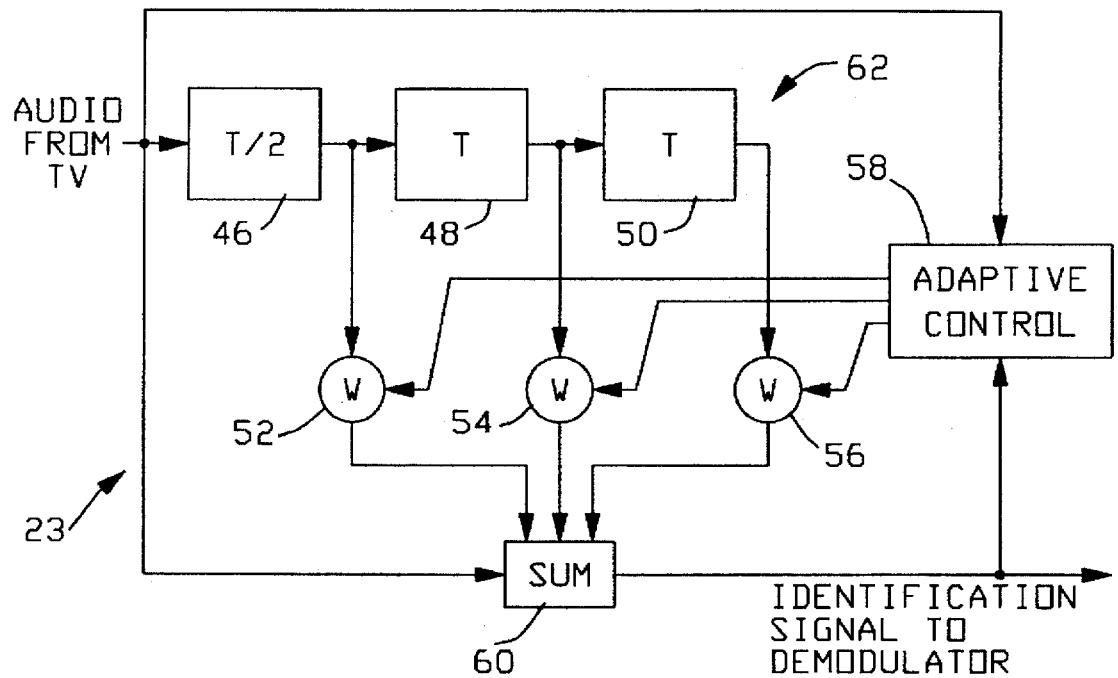
FIG. 5 shows an alternative embodiment of another portion of the system of FIG. 1.

Adaptive filter 22 of FIG. 2A and adaptive filter 23 of FIG. 5 are each preferably implemented with a transversal filter. The input signal is passed through a series of delays. Each delayed replica of the signal is then multiplied by a weight value (W) with a range to +1 to −1. The weighted replicas are then added together. The weight values are selected, automatically by the adaptive control 58 function, in order to minimize the total power at the output of the summer 60. If we assume that: a) the audio signal has a much greater amplitude than the identification signal, and b) the spectrums of the audio and identification signals differ significantly with the bandwidth of the identification signal being wider than that of the audio signal; then the adaptive filter 22 and 23 will attenuate much of the audio signal energy to a much greater degree than the identification signal energy is attenuated. This will result in a net improvement in the identification signal to audio ratio.

A side effect of the above transversal filter implementation is that delayed replicas of the identification signal are also generated. In a standard chip waveform (i.e. 100% duty cycle) these delayed replicas will distort the identification signal. This degradation is known as inter-chip interference. Inter-chip interference makes it much more difficult for the demodulator to synchronize to the spreading code, because delayed replicas of the code can corrupt the correlation process resulting in false lock indications. Poor synchronization and partial attenuation of the identification signal also increases the probability of a bit error in the identification sequence.

The preferred approach of the present invention to this problem involves modifying the standard chip waveform to one using a 50% duty cycle waveform as illustrated in FIG. 3. The chip waveform will have a value of +1 or −1 for half the chip time "T". During the other half of the chip time, the chip waveform will have a value of zero.

The transversal filters in FIG. 2A and in FIG. 5 each have taps that are spaced at odd multiples of half a chip time (T/2, 3T/2, 5T/2). Therefore, all delayed replicas of the active portion of the identification signal will occur during the zero portion of subsequent chip times. The resultant waveform, illustrated in FIG. 3 A, will permit the value of the chips to remain undistorted. The correlators will be able to synchronize to the spreading sequence with a very low probability of false locks. Alternatively, these total delays at the delay line taps can be odd multiples of xT, where x is less than or equal to 0.50 or 50%; the chip duty cycle ratio imposed by generator 38 would then be less than or equal to x.

Once synchronization is achieved, the demodulator can be gated on only during the active portion of the chip time. This will prevent the delayed replicas of previous chips from affecting the demodulation process. Half of any remaining audio signal energy will also be eliminated prior to demodulation. The probability of making a bit error in the identification sequence is thereby reduced.

The adaptively filtered audio signal produced by summer 60 is then processed further by a non-linear density discrimination technique provided by density detector 24 of FIG. 2A. This technique at least partially suppresses large signals by operating on the amplitude distribution of the audio signal. A key aspect of the present density discrimination technique of decoder 20 is that the audio signal is distorted by a memoryless non-linear function. This non-linear function is derived from an estimate of the PDF (probability distribution function—a representation of the relative frequency of occurrence of specific amplitude values in the signal) of the incoming audio signal. The preferred non-linear function is:

$$g(n) = -\frac{f_n'(n)}{f_n(n)}$$

where
  g(n) is the non-linear function
  $f_n(n)$ is the PDF of the signal
and
  $f_n'(n)$ is the derivative of the PDF This has the effect of flattening out the audio signal. Because in the present preferred embodiment the content or amplitude or magnitude of the identification sisal is relatively very small compared to the audio signal and hence the identification signal does not contribute greatly to the PDF of the audio signal, the identification signal is not affected by this operation. The result of this process is that the audio signal is thereby suppressed relative to the identification signal. The use of this pre-processing significantly increases the data content of the identification message for a given level of sub-audibility. This allows more precise, unambiguous identification of the program source and/or transmission channel with minimal post-processing by the end user. Also see J. Capon, "Optimum Coincidence Procedures for Detecting Weak Signals in Noise," in *IRE Int. Conv. Rec.*, Vol. 8, Part 4, pp. 154–166, 1960, and James H. Miller and John B. Thomas, "Detectors for Discrete—Time Signals in Non-Gaussian Noise", in *IEEE Transactions on Information Theory*, Vol. IT-18, No. 2, pp. 241–250, March 1972, which are hereby incorporated by reference herein.

The effective processing gain of the modulators and correlators 28 is increased in the system of FIG. 1 by additional processing prior to demodulating the spread spectrum identification signal, to partially reject the audio signal. This pre-processing is accomplished by adaptive filter 22 and digital density detector 24. A combination of pre-processing, provided by adaptive filter 22 and detector 24, is used to suppress the audio signal provided to decoder 20 prior to despreading of the resulting signal.

FIG. 5 shows an alternative adaptive transversal filter 23 which can be utilized in lieu of filter 22 of FIG. 2A as filter 22 of FIG. 1. Filter 23 of FIG. 5 is preferred to filter 22 of FIG. 2A because, and differs from filter 22 of FIG. 2A in that, an additional feedback line from the output of summer 60 is provided to adaptive control 58.

Adaptive filter 22 or 23 is used to suppress the audio signal. The tapped delay line structure forms a high pass filter that eliminates most of the audio signal energy. In general, adding more taps to delay line 62 will result in greater suppression of the audio signal. To prevent the identification signal from being distorted by this suppression, it can be preferably given a 50% duty cycle chip structure, as shown in FIG. 3. Because the preferred respective total delays appearing at the delay line taps immediately following delays 46, 48 and 50 are T/2, 3T/2 and 5T/2, which are odd multiples of half a chip period, the active portion of each chip will not be corrupted by artifacts from other chips (i.e., no inter-chip interference). Alternatively, these total delays at the delay line taps can be odd multiples of xT, where x is less than or equal to 0.50 or 50%; the chip duty cycle ratio imposed by generator 38 would then be less than or equal to x.

Figure 6:
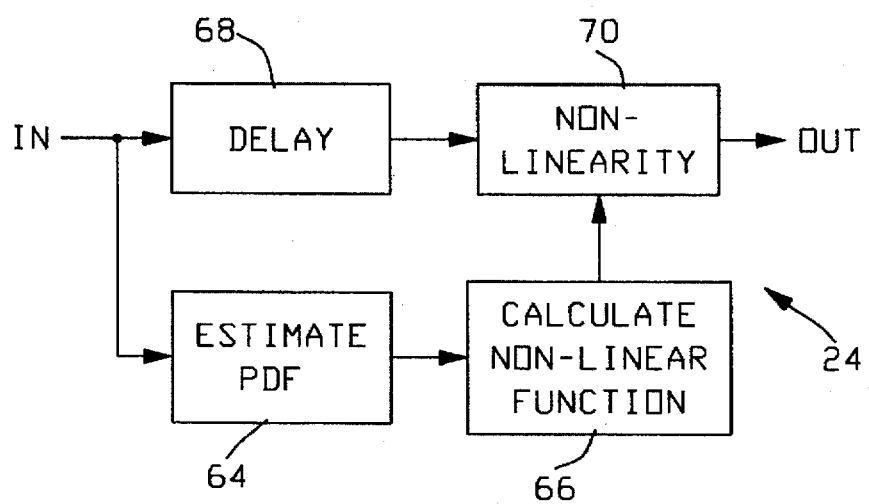
FIG. 6 shows in greater detail an embodiment (also shown in FIG. 2A) of still another portion of the system of FIG. 1.
Figure 7:
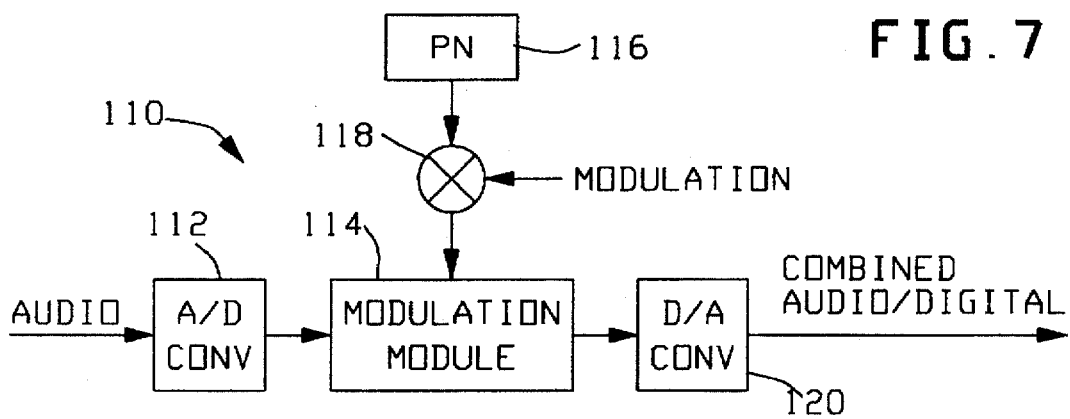
FIG. 7 is a block diagram of one embodiment of a modulator that can be utilized in the encoder of FIGS. 1 and 2A.
Figure 8:
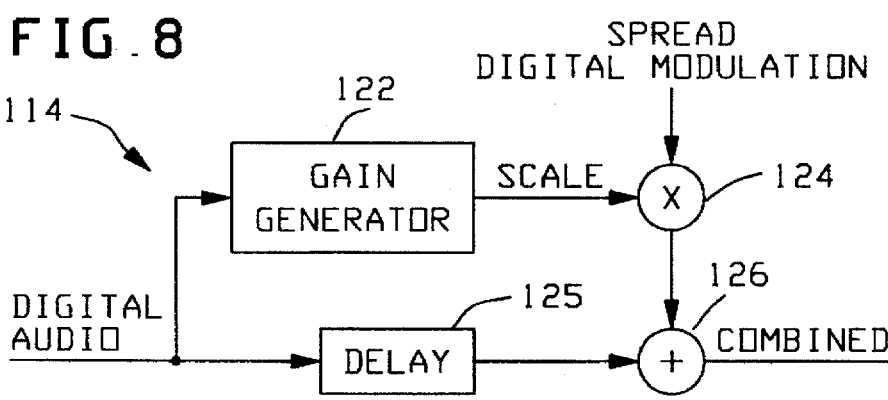
FIG. 8 shows in greater detail a portion of the system of FIG. 7.
Figure 9:
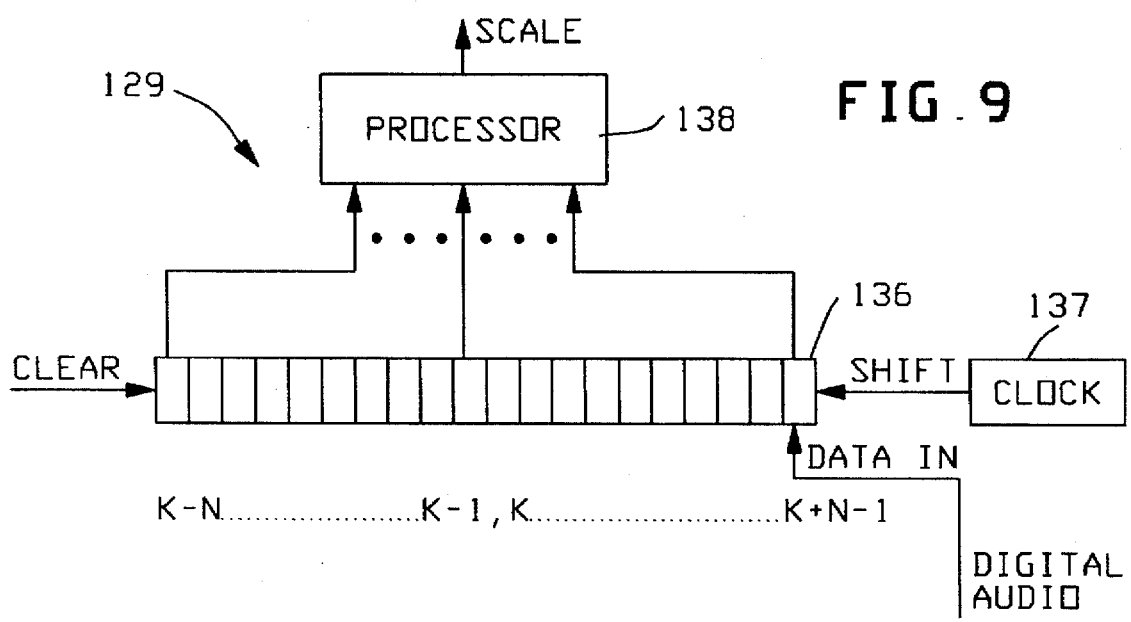
FIG. 9 shows a sliding filter utilized in a portion of the system of FIG. 8.
Figure 10:
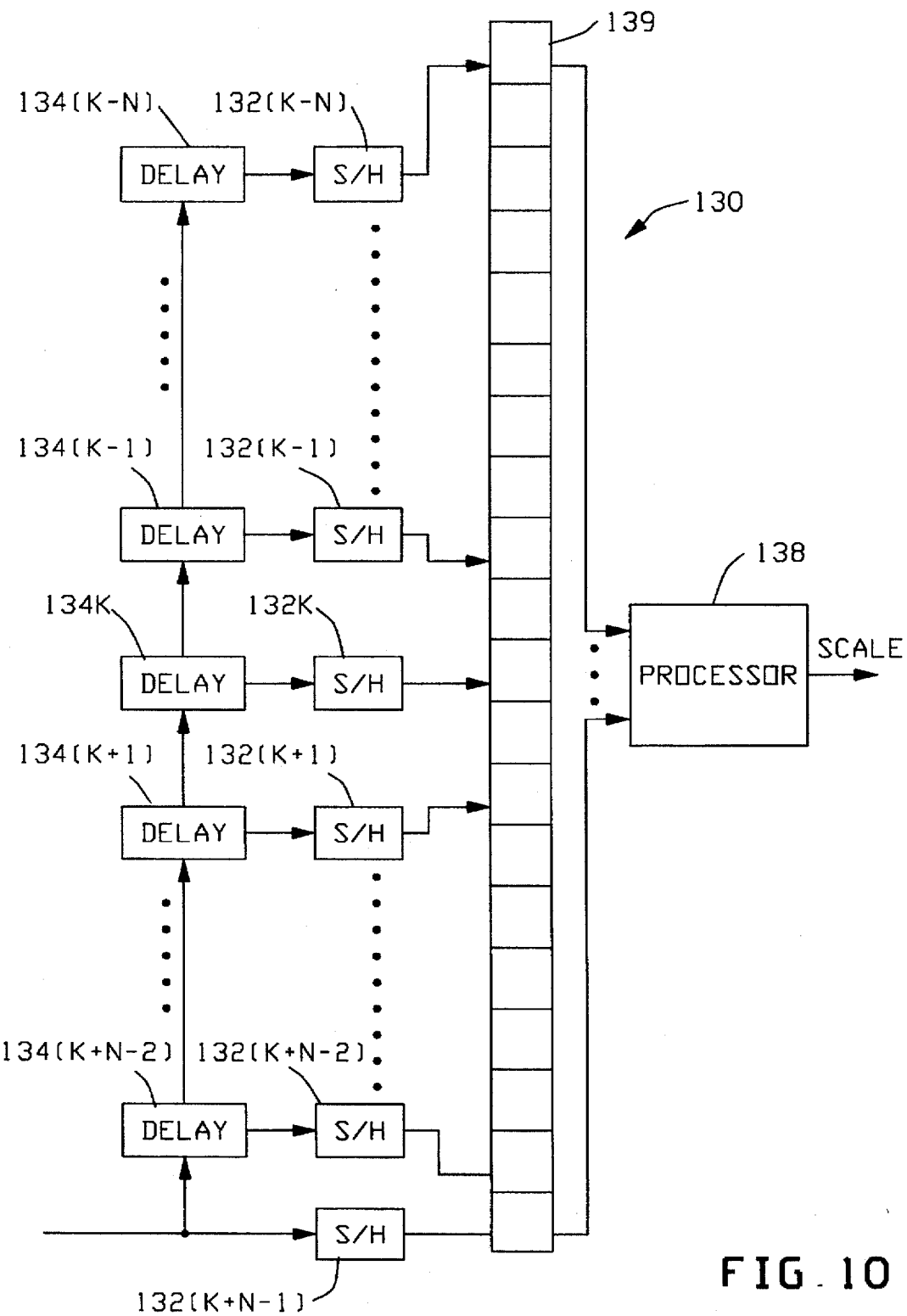
FIG. 10 shows an alternative sliding filter utilized in a portion of the system of FIG. 11 is a flowchart for computer software implementing the sliding filter of FIG. 12 is a flowchart for computer software implementing the sliding filter of FIG. 10.
Figure 11:
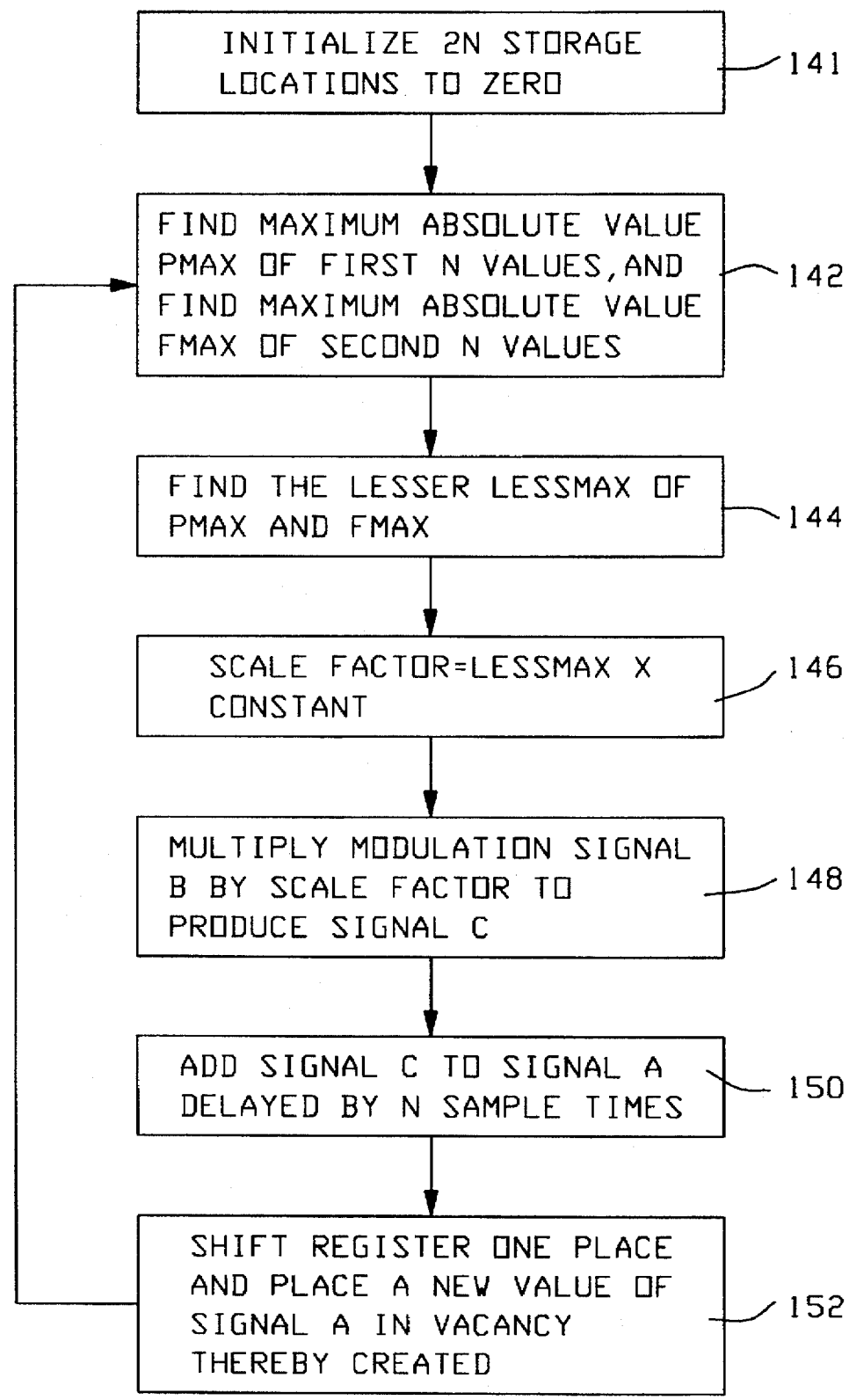
Figure 12:
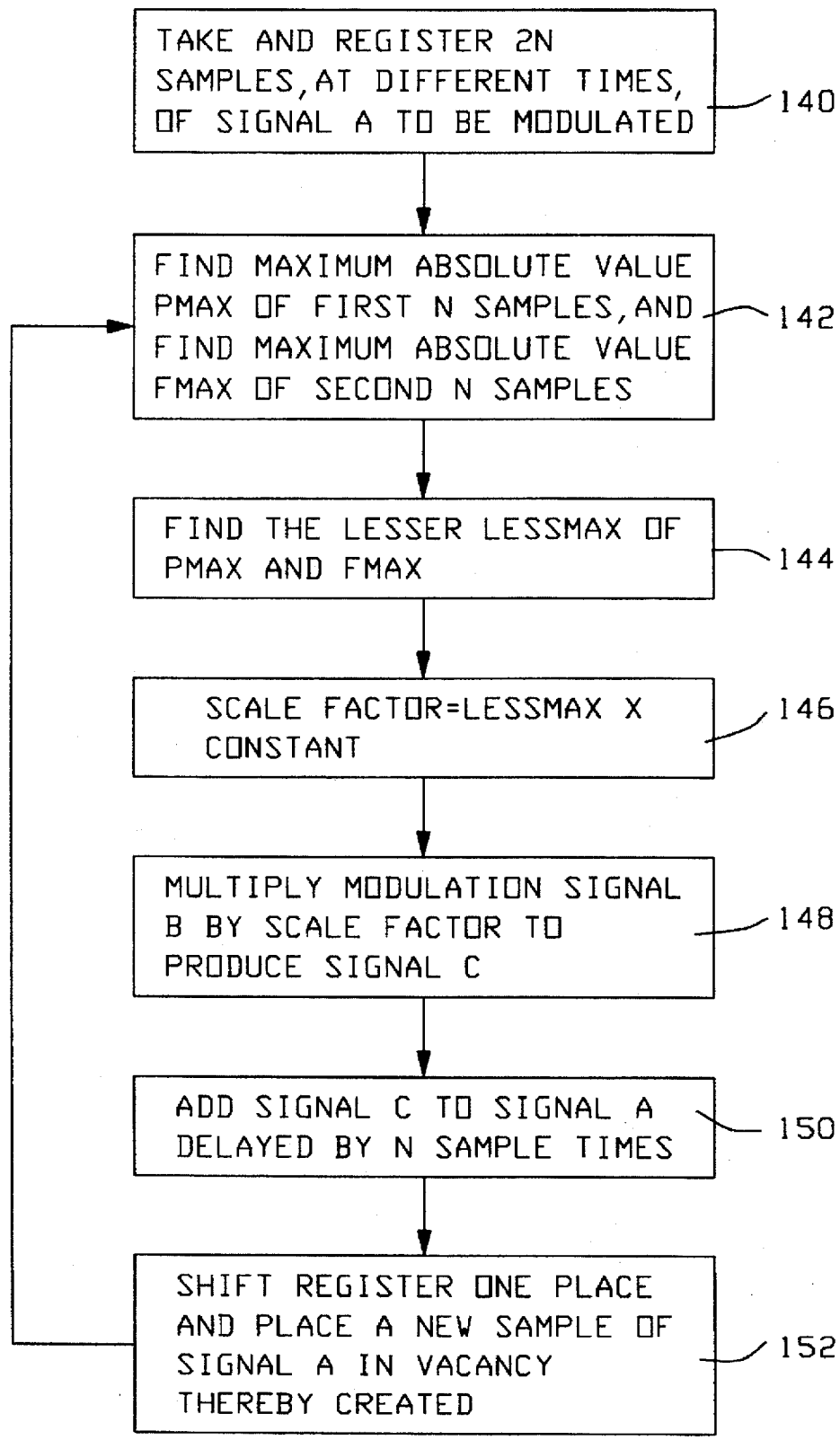
Figure 13:
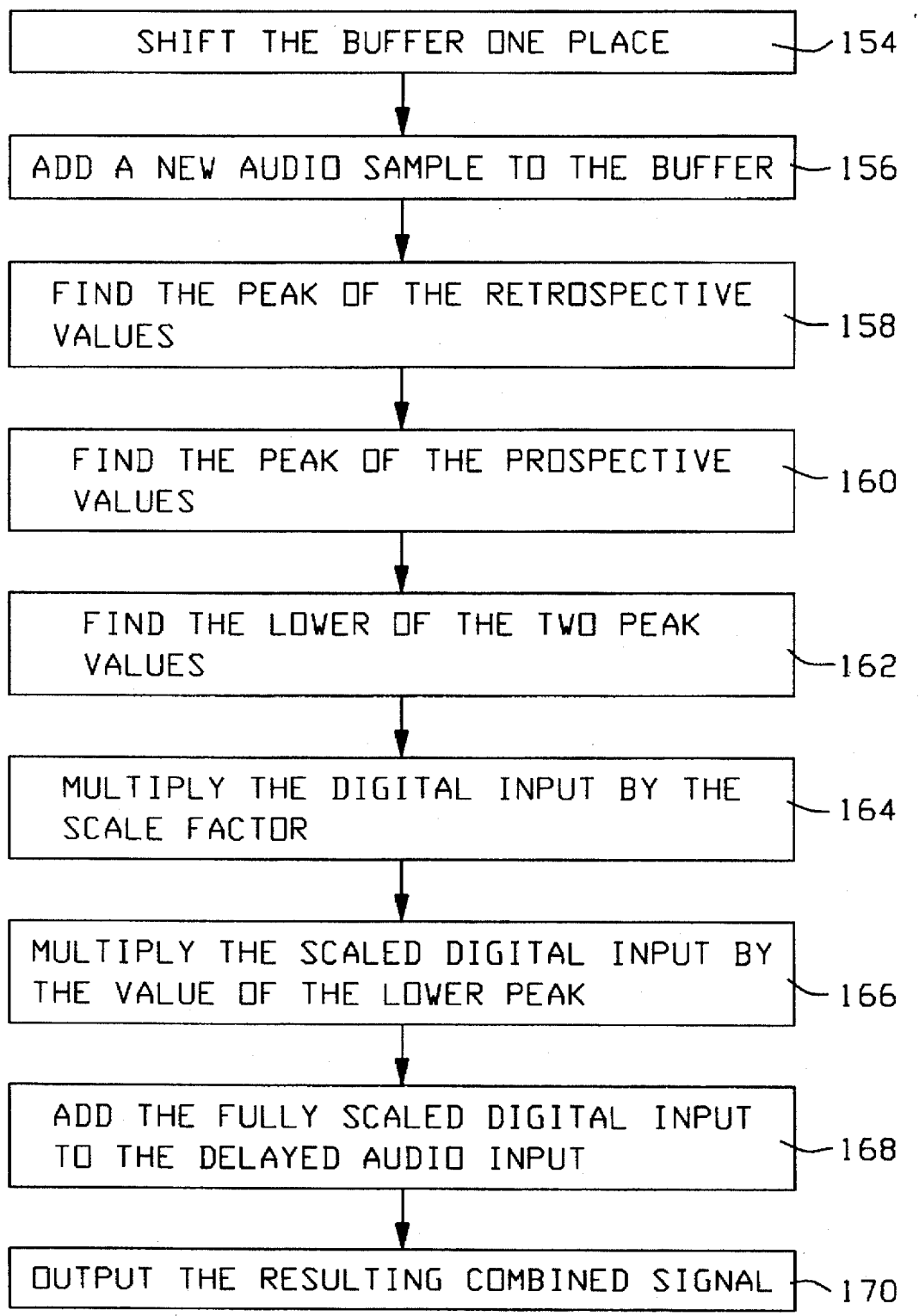
FIG. 13 is a more detailed flowchart for a portion of computer software implementing the sliding filter of FIG. 9 or FIG. 10.
Figure 14:
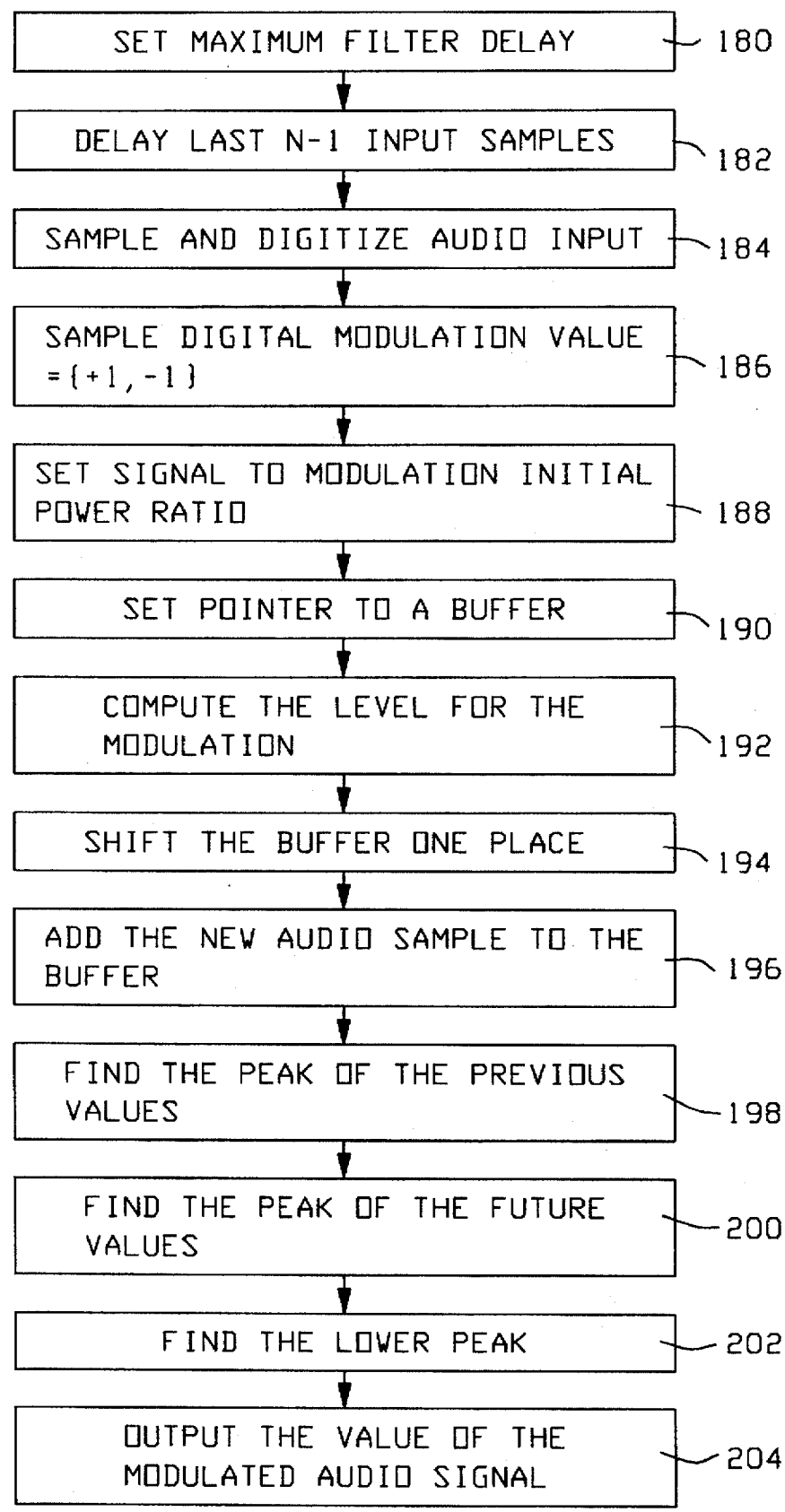
FIG. 14 is a flowchart for alternative software implementing the sliding filter of FIG. 9 or FIG. 10.

Detector 24 is shown in greater detail in FIG. 2A and, for convenience and clarity, separately in FIG. 6. Non-linear density discriminator 24 suppresses larger signals by operating on the amplitude distribution of the audio signal. In detector 24, the audio signal is distorted by a memoryless non-linear function, g(n)=−f'(n)/f(n). This non-linear function is derived from an estimate of the PDF f(n) of the incoming audio signal. In FIG. 6, this estimation is performed by estimator 64. Block 66 receives the result of the PDF estimation from block 64 and uses that result to determine the non-linear function g (n) defined above. A delay 68 is imposed on the incoming signal from filter 22 or 23 so that the non-linear function is applied to the appropriate portion of that signal. At block 70, the non-linear signal or code produced by block 66 is mixed or multiplied with the delayed signal from block 68 to vary the amplitude of the latter signal, thereby non-linearly distorting that signal to remove the high level (audio) signal and thereby recover the low level (identification) signal embedded in the high-level signal.

The degree of suppression of the audio signal provided by filter 22 or 23 and discriminator 24 depends on the PDF of the audio signal to be suppressed. If that signal is Gaussian (e.g. thermal noise), then no suppression will occur because the derivative of a Gaussian function is the same Gaussian traction, so that g (n) is then a linear function.

It is preferred that adaptive filter 22 or 23 precede digital density detector 24. This is because the adaptive filter 22 or 23 makes the received audio signal less Gaussian, thereby improving performance of detector 24.

After the audio signal has been suppressed by filter 22 or 23 and discriminator 24, automatic level control 26 adjusts (e.g., amplifies) the remaining identification signal. Because of the level control 42 applied by encoder 12 when the identification signal is combined with the audio signal, the identification signal has overall a relatively very low amplitude. Automatic level control 26 adjusts the amplitude of the identification signal to make it easier to demodulate.

The identification signal processed by filter 22 or 23, discriminator 24 and automatic level control 26 is then provided to correlators and demodulators 28. Correlators and demodulators 28 are shown in greater detail in FIG. 2B. As described above, more than one identification signal can be applied to a single audio signal, although plural encoders 12 may be needed for that purpose, one to apply each of those signals. As shown in FIG. 2B, correlators and demodulators 28 includes a plurality of correlation and demodulation channels, one for each such type of identification signal. Since each such identification signal would have had a different pseudonoise code or the like applied to it for spreading, the code that is used to despread one such signal would likely not successfully despread another such signal. The code that was used to spread such a signal is also to be used to despread that signal.

FIG. 2B shows four correlation and demodulation channels, labeled A through D, which are provided for the separate correlation and demodulation of four sets or types of identification signals. Multiple levels of identification signals are thereby simultaneously recovered using a set of parallel demodulator channels, each adapted to receive a particular class of identification signal (e.g. program, network, local station, etc.). Of course, if more or less than four levels or types of identification signals are applied to the audio signal, then the number of channels provided by correlators and demodulators 28 can be set or varied accordingly. In other words, although four such channels are shown in FIG. 2B, the actual number of channels employed in any particular application can be greater or less than four, and would be set based on the number of levels or types of identification signals applied to the audio signal. The signal produced by automatic level control 26 is applied to matched filter correlators 72, 80, 88 and 96, and (via respective gates 75, 83, 91 and 99) to spread spectrum demodulators 76, 84, 92 and 100. Spread spectrum demodulators 76, 84, 92 and 100 can generally be similar to each other, but each would receive a unique spreading code from the corresponding spread code generator. Thus, spread code generator 74, spread code generator 82, spread code generator 90 and spread code generator 98 would each produce a different spread code. Each such spreading code respectively corresponds to the spreading code that is applied to originally spread the desired level or type of identification signal before that signal is applied to the audio signal. Each matched filter triggers operation of the corresponding spread code generator and (via a gate) the corresponding spread spectrum demodulator for its channel. Thus, matched filter correlator 72 triggers generation of the spreading code by generator 74 and (via gate 75) operation of demodulator 76. Matched filter correlator 80 triggers operation of generator 82 and (via gate 83) demodulator 84. Matched filter correlator 88 triggers operation of generator 90 and (via gate 91) demodulator 92. Matched filter correlator 96 triggers operation of generator 98 and (via gate 99) demodulator 100. Each matched filter correlator will only provide such a trigger signal if it detects the presence of a preamble or header code sequence identifying that channel. Each demodulator mixes or multiplies the corresponding spread code with the signal from automatic level control 26 (if permitted by the corresponding matched filter correlator) to despread that signal and thereby recover the originally applied identification sequence or code. That sequence is then read by the corresponding reader 78, 86, 94 or 102. The recovered identification signals are then time tagged and stored in storage or memory 30. Thus, storage or memory 30 will have a record of the programs, providers, etc. that were demodulated by receiver 18.

To maximize the acquisition of the identification signal, a pre-set correlator is provided for each such channel that is matched to the preamble of a particular identification signal. Once the signal has been acquired and the timing information recovered, the signal is then synchronously demodulated by the corresponding spread spectrum demodulator and the identification message is thereby recovered.

The matched filter correlator determines whether a preamble or header for its channel is present, for acquisition of and synchronization to that message. The matched filter correlator thereby speeds up acquisition of an identification message intended for that channel, and synchronization of the spreading code with that message, faster than would be available with a search type algorithm.

Although the application and recovery of program or link identification signals to and from a television audio signal is described above, it should be understood that other such signals can be applied by the present invention to other than audio signals. For example, a verification signal could be applied by encoder 12 to an information signal, and after that information signal has been received and demodulated the verification signal can be recovered therefrom to verify the accuracy and/or source of the information signal. Thus, it should be understood that the present invention can be used for applying one or more additional signals to, and recovering those signals from, varying signals other than audio signals.

As discussed above, a pseudonoise code or a pseudo-random spreading code can be mixed or multiplied with digital data to spread it. The spread signal can then be added to an audio signal at a constant level. For the audio signal not to be degraded, the constant level must be low enough so that the spread signal cannot be heard even when the audio level is low. When using a low constant level, the detection of the digital data is severely constrained. Accordingly, it is preferred to instead adaptively vary the level of the spread signal, so that the average spread signal level can be increased significantly. This increased average spread signal level greatly improves the detectability of the identification message.

Some of the many advantages of the invention should now be readily apparent. For example, apparatus and method have been provided for providing positive identification of the program source and/or distribution channel of a radio or television performance or production or for any other data. The data can thereby be identified directly, cross references to a program schedule or line up are no longer needed, various points in the distribution channel for the data can be positively identified, and previously recorded programs can be thereby identified. Such apparatus and method does not require any modifications to the user's receiver, but utilizes an already existing signal (the received demodulated signal). The present invention thereby minimizes installation and maintenance costs, and improves acceptance by potential users. The present invention does not degrade the quality of the received data, thereby improving acceptance by potential users. Multiple identification messages can be detected concurrently with the present invention, so that data source and multiple points in the distribution chain for the data can be identified, and so that identification messages can be applied independently of each other.

Furthermore, the present invention provides greater bandwidth for the added messages than would be provided with spread spectrum processing alone. For example, the audio bandwidth of a television signal is 15 kilohertz. A data rate of up to 150 hertz may be needed to uniquely identify a wide enough range of individual programs and commercials. Using conventional spread spectrum techniques, these values would limit the available spread spectrum processing gain to 20 dB. At this level, such an identification signal applied to the audio signal of a TV program transmission would probably be audible. Available channel bandwidth ($BW_c$) is limited; for this example, that bandwidth is 15 KHz. Any minimum ratio of audio signal magnitude to identification signal magnitude (A/I) is also required to be sub-audible for this example, and would for this example be required to be at least 30 dB. In the standard spread spectrum approach without the pre-processing described above, the amount of Spread Spectrum Processing Gain (SSPG) required to demodulate the received identification signal is approximately SSPG minus A/I plus 10 dB (which for this example would be SSPG—40 dB). SSPG is identified as the ratio of the spread bandwidth (i.e. $BW_c$) and the data bandwidth ($BW_D$); for this example, $BW_C/BW_D$=40 dB. For the standard spread spectrum approach, the maximum data bandwidth $BW_D$ that this system can handle is $BW_C$/SSPG; for this example, $BW_D$=$BW_C$/SSPG=15,000/10,000=1.5 bps. In contradistinction, in the present invention, assume that the pre-processing provided by adaptive filter 22 and digital density detector 24 attenuates the audio signal by some amount α prior to demodulation of the received identification signal. For this example, assume α=20 dB. With this preprocessing, the $SSPG_P$ required to demodulate the received identification signal would be $SSPG_P$=A/I−α+ 10 dB; for this example, $SSPG_P$ would then be 20 dB. The maximum data bandwidth $BW_D$ that the present invention can handle is $BW_C$/$SSPG_P$; for this example $BW_D$=$BW_C$/ $SSPG_P$=15,000/10=150 bps. Thus, particularly because of the preprocessing provided by adaptive filter 22 and digital density detector 24, the present invention has the capability of providing greater available bandwidth for the identification signal then would conventional spread spectrum techniques alone, while still accommodating the same degree of sub-audibility (A/I) by enabling the system to operate using a lesser amount of spread spectrum processing gain. Thus, the present invention provides for higher data rates than would conventional spread spectrum techniques alone. With this capability, longer messages can be sent, so that more precise identification of program, data and/or distribution channel(s) can be thereby provided. As another result, identification messages can be sent more frequently, so that more accurate time resolution is provided.

Thus there has been provided apparatus and method for embedding an identification or other type message in an audio or other data signal and recovering it without affecting the quality of that audio or other data signal. For example, apparatus and method have been provided that permit a sub-audible coded message to be inserted in the audio portion of a television signal in order to enable positive identification of the television program or commercial currently being viewed by a user. The program, network, television station, etc. can thereby be identified such as for the purpose of automatic ratings. A coded message can thereby be inserted into an audio signal, and the message can be subsequently recovered, without affecting the quality of the audio program or signal. This can be used to identify the source of a program, identify the distribution channel that the program was received over, and to embed other messages that can be used to facilitate the performance of other functions.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. Apparatus for identifying a first signal, comprising:

first sisal generating means for generating an identification signal;

second signal generating means for generating a spreading signal, that can be used to spread the identification signal, and having a duty cycle less than or equal to 50%;

first sisal processing means, receiving the identification signal and the spreading signal, for spreading the identification signal using the spreading signal, to produce a spread identification signal;

first combining means for combining the spread identification signal with the first signal to produce a combined signal;

a transmitter, receiving the combined signal, for transmitting the combined signal;

a receiver receiving the transmitted combined signal;

a delay line, receiving the received combined signal, having a first plurality of taps, wherein each of said taps produces a replica of the received combined signal delayed by a respective odd multiple of 50% or less of the period of the spreading signal;

a first plurality of weighted multipliers, each of said weighted multipliers receiving a respective one of said first plurality of taps and multiplying the signal on that tap by a weighted value to produce a respective weighted delayed signal;

first control means responsive to the received combined signal for individually controlling the weighted values of said weighted multipliers; and second combining means for combining the weighted delayed signals to produce a second signal wherein the first signal has been at least partially suppressed.

2. Apparatus as defined in claim 1 wherein each of said taps of said delay line produces a replica of the received combined signal delayed by a respective odd multiple of a percentage, of the period of the spreading signal, that is greater than or equal to the duty cycle percentage of said second signal generating means.

3. Apparatus as defined in claim 1 wherein said first control means applies a least mean squared algorithm to the received combined signal.

4. Apparatus as defined in claim 1 wherein said first control means is also responsive to the second signal.

5. Apparatus as defined in claim 1, further comprising:
tagging means, disposed between said first signal processing means and said first combining means, for applying a tag to the spread identification signal;
second signal processing means for unspreading the second signal; and
second control means, responsive to the tag, for permitting operation of said second signal processing means only while the spread identification signal is present in the second signal.

6. Apparatus for identifying a first signal, comprising:
first signal generating means for generating an identification signal;
second signal generating means for generating a spreading signal, that can be used to spread the identification signal, and having a duty cycle less than or equal to 50%;
first signal processing means, receiving the identification signal and the spreading signal, for spreading the identification signal using the spreading signal, to produce a spread identification signal;
first combining means for combining the spread identification signal with the first signal to produce a combined signal;
a delay line, receiving the combined signal, having a first plurality of taps, wherein each of said taps produces a replica of the combined signal delayed by a respective odd multiple of 50% or less of the period of the spreading signal;
a first plurality of weighted multipliers, each of said weighted multipliers receiving a respective one of said first plurality of taps and multiplying the signal on that tap by a weighted value to produce a respective weighted delayed signal;
first control means responsive to the combined signal for individually controlling the weighted values of said weighted multipliers; and
second combining means for combining the weighted delayed signals to produce a second signal wherein the first signal has been at least partially suppressed.

7. Apparatus as defined in claim 6 wherein each of said taps of said delay fine produces a replica of the combined signal delayed by a respective odd multiple of a percentage, of the period of the spreading sisal, that is greater than or equal to the duty cycle percentage of said second signal generating means.

8. Apparatus as defined in claim 6 wherein said first control means applies a least mean squared algorithm to the combined signal.

9. Apparatus as defined in claim 6 wherein said first control means is also responsive to the second signal.

10. Apparatus as defined in claim 6, further comprising:
tagging means, disposed between said first sisal processing means and said first combining means, for applying a tag to the spread identification signal;
second signal processing means for unspreading the second signal; and
second control means, responsive to the tag, for permitting operation of said second signal processing means only while the spread identification signal is present in the second signal.

11. Apparatus for identifying a first signal, comprising:
a first plurality of first signal generating means each for generating a respective identification signal;
a first plurality of second signal generating means each for generating a respective spreading signal, that can be used to spread a respective identification signal, and having a duty cycle less than or equal to 50%;
a first plurality of first signal processing means, respectively receiving a respective one of the identification signals and a respective one of the spreading signals, for respectively spreading that identification signal using that spreading signal, to produce a respective spread identification signal;
a first plurality of first combining means for combining the spread identification signals with the first signal to produce a combined signal;
a transmitter, receiving the combined signal, for transmitting the combined signal;
a receiver receiving the transmitted combined signal;
a delay line, receiving the received combined signal, having a second plurality of taps, wherein each of said taps produces a replica of the received combined signal delayed by a respective odd multiple of 50% or less of the period of the spreading signal;
a second plurality of weighted multipliers, each of said weighted multipliers receiving a respective one of said second plurality of taps and multiplying the signal on that tap by a weighted value to produce a respective weighted delayed signal;
first control means responsive to the received combined signal for individually controlling the weighted values of said weighted multipliers; and
second combining means for combining the weighted delayed signals to produce a second signal wherein the first signal has been at least partially suppressed.

12. Apparatus as defined in claim 11 wherein each of said taps of said delay line produces a replica of the received combined signal delayed by a respective odd multiple of a percentage, of the period of the spreading signal, that is greater than or equal to the duty cycle percentage of said second signal generating means.

13. Apparatus as defined in claim 11 wherein said first control means applies a least mean squared algorithm to the received combined signal.

14. Apparatus as defined in claim 11 wherein said first control means is also responsive to the second signal.

15. Apparatus as defined in claim 11, further comprising:
a first plurality of tagging means, each disposed between a respective said first signal processing means and a respective said first combining means, for applying a respective tag to the respective spread identification signal;
a first plurality of second signal processing means for unspreading the second signal; and a first plurality of second control means, each responsive to a respective one of the tags, for permitting operation of a respective one of said second signal processing means only while the respective spread identification signal is present in the second signal.

16. Apparatus for identifying a first signal, comprising:

a first plurality of first signal generating means each for generating a respective identification signal;

a first plurality of second signal generating means respectively for generating a respective spreading signal, that can be used to spread a respective identification signal, and having a duty cycle less than or equal to 50%;

a first plurality of first signal processing means, respectively receiving a respective one of the identification signals and a respective one of the spreading signals, for respectively spreading that identification signal using that spreading signal, to produce a respective spread identification signal;

a first plurality of first combining means for combining the spread identification signals with the first signal to produce a combined signal;

a delay line, receiving the combined signal, having a second plurality of taps, wherein each of said taps produces a replica of the combined signal delayed by a respective odd multiple of 50% or less of the period of the spreading signal;

a second plurality of weighted multipliers, each of said weighted multipliers receiving a respective one of said second plurality of taps and multiplying the signal on that tap by a weighted value to produce a respective weighted delayed signal;

first control means responsive to the combined signal for individually controlling the weighted values of said weighted multipliers; and second combining means for combining the weighted delayed signals to produce a second signal wherein the first signal has been at least partially suppressed.

17. Apparatus as defined in claim 16 wherein each of said taps of said delay line produces a replica of the combined signal delayed by a respective odd multiple of a percentage, of the period of the spreading signal, that is greater than or equal to the duty cycle percentage of said second signal generating means.

18. Apparatus as defined in claim 16 wherein said first control means applies a least mean squared algorithm to the combined signal.

19. Apparatus as defined in claim 16 wherein said first control means is also responsive to the second signal.

20. Apparatus as defined in claim 16, further comprising:

a first plurality of tagging means, each disposed between a respective said first signal processing means and a respective said first combining means, for applying a respective tag to the respective spread identification signal;

a first plurality of second signal processing means for unspreading the second signal; and a first plurality of second control means, each responsive to a respective one of the tags, for permitting operation of a respective one of said second signal processing means only while the respective spread identification signal is present in the second signal.

21. A method for identifying a first signal, comprising the steps of:

generating an identification signal;

generating a spreading signal;

spreading the identification signal using the spreading signal, to produce a spread identification signal;

combining the spread identification signal with the first signal to produce a combined signal;

at least partially filtering the first signal from the combined signal by applying an adaptive algorithm to the combined signal, to produce a second signal;

non-linearly density discriminating the second signal, to produce a third signal in which the first sisal is further removed from the second signal;

amplifying the third signal; and unspreading the third signal to produce the identification signal.

22. Apparatus for identifying a first signal, comprising:

means for generating an identification sisal;

means for generating a spreading signal;

means for spreading the identification signal using the spreading signal, to produce a spread identification signal;

means for combining the spread identification signal with the first signal to produce a combined signal;

means for at least partially filtering the first signal from the combined signal by applying an adaptive algorithm to the combined signal, to produce a second signal;

means for non-linearly density discriminating the second signal, to produce a third signal in which the first signal is further removed from the second signal;

means for amplifying the third signal; and means for unspreading the third signal to produce the identification signal.

* * * * *